Aug. 16, 1966   W. R. MUSTIAN, JR., ET AL   3,266,557
APPARATUS AND METHOD FOR TREATING PHOSPHORIC
ACIDS AND THE LIKE
Filed March 25, 1964
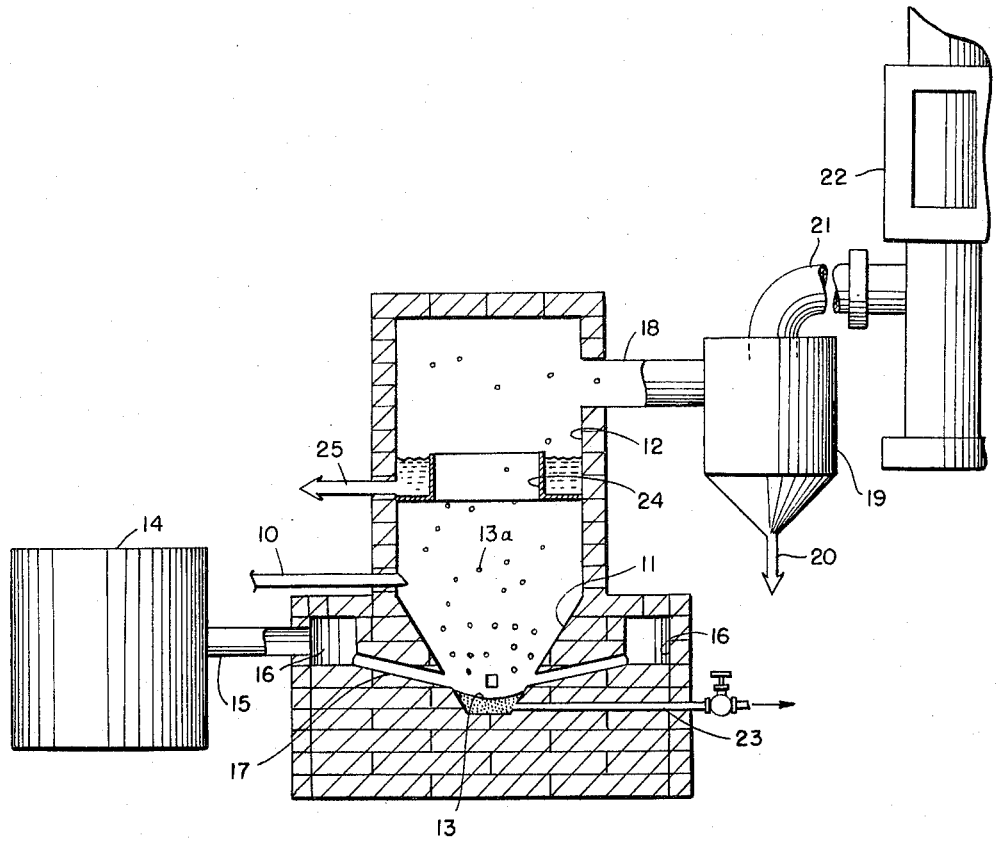
INVENTORS:
WILLIAM R. MUSTIAN, JR.
PHILLIP E. HYNSON
BY: *Carl C. Batz*
ATT'Y 3,266,557
APPARATUS AND METHOD FOR TREATING
PHOSPHORIC ACIDS AND THE LIKE
William R. Mustian, Jr., Lakeland, and Phillip E. Hynson,
Winter Haven, Fla., assignors to Armour and Company,
Chicago, Ill., a corporation of Delaware
Filed Mar. 25, 1964, Ser. No. 354,738
4 Claims. (Cl. 159—16)

This invention relates to apparatus and method for treating phosphoric acids and the like. The invention is particularly useful in the concentration of wet process phosphoric acids containing metal salts and other impurities and for the treatment of other liquids to separate impurities therefrom.

Wet process phosphoric acids contain from 1 to 15 percent of metal oxides and other impurities, the usual content being from 5 to 10 percent, and such impurities have long been a problem in dealing with phosphoric acids. The presence of impurities in the product limits the uses to which the product can be obtained, and particularly makes the product unsuitable for food grade uses, use in detergents, and in other product fields. Further, when the product is concentrated by the removal of water to a relatively high degree, poly acids, including metaphosphoric acid, are formed, and at least some of the poly acid fraction combines with the metal oxides to form salts which settle out and form undesirable solids in the product. Workers in this field have been warned to maintain lower temperatures at which metaphosphoric acid fractions are not formed in order to prevent a deposition of solids.

In processes in which hot combustion gases are introduced into the phosphoric acid pool through dip pipes or other devices which form hot spots in the vapor space of the dehydration chamber, solids collect on such hot surfaces reducing the flow area, and segments of such solids break off and plug outlet openings, etc. Such conditions have long presented severe limitations in dehydration operations.

We have discovered that high temperatures, which are desirable for obtaining highly concentrated phosphoric acid products, can be employed, and that the concurrent formation of a fraction of metaphosphoric acid or other poly acids may be utilized in a beneficial manner for the removal of the impurities in a continuous process, and we have provided apparatus which is particularly effective in the separation of the impurities and the separate recovery of an acid product having very little impurities. Further, we have discovered that through novel apparatus and process steps, acid products may be concentrated while providing a relatively open dehydration zone in which the purified product can be collected and recovered and thus eliminating the use of a hot dip pipe or other device having hot surfaces upon which solids accumulate.

An object of the invention, therefore, is to provide apparatus and process steps for the recovery of a purified acid product and for the recovery separately of a residue containing the bulk of the impurities. A further object is to provide a process in which wet process phosphoric acid or the like can be heated by lateral gas jets producing entrainment of acid whereby a relatively pure product can be obtained from such entrained material. Yet another object is to provide apparatus and methods by which vaporization of phosphoric acid or the like can be accomplished in a dehydration zone which is relatively open and unobstructed for receiving entrained droplets, while providing means for the recovery of such droplets to provide a product relatively free of impurities. Other specific objects and advantages will appear as the specification proceeds.

The invention is shown, in an illustrative embodiment, by the accompanying drawing, in which:

FIG. 1 is a side view in elevation, and partly in section, of apparatus embodying our invention and in which our new process may be carried out.

In one embodiment of our invention, a wet process phosphoric acid is supplied to an evaporator to provide a pool therein, and a stream or streams of combustion gases are directed against the pool from points laterally of the pool whereby the acid in the pool is heated to vaporizing temperatures and droplets of the acid are entrained in the gases rising upwardly in the zone. The gaseous products of combustion, together with water vapor and some entrained acid, may be drawn off from the upper part of the dehydration zone, and entrained droplets may also be captured in a vessel maintained within the zone. The liquid product in such vessel is withdrawn, and similarly an acid product withdrawn with the vapors and combustion gases is also recovered as product.

The pool temperature is maintained preferably by regulating the feed rate of fresh acid into the pool. The stream of hot gases employed to heat the acid pool has a velocity which not only heats the pool but carries droplets of acid upwardly in the evaporator, and such entrainment is increased by directing the jets of combustion gases at an inclined direction upon the acid pool. The metal and other impurities react with phosphoric poly acids, and particularly with cyclic (e.g. metaphosphoric) acid, to form a heavy residue, and such material moves downwardly into the liquid pool and may be withdrawn separately as a product.

As a specific illustration, and referring more particularly to the drawing, wet process phosphoric acid, preferably of the range 27 to 64 weight percent phosphorus calculated as $P_2O_5$ equivalent, is pumped through feed line 10 into the frusto-conical portion 11 of the evaporator 12, and such acid forms a pool 13 in the lower portion of the reaction chamber or conical portion 11 of the evaporator. Products of combustion are passed from the furnace 14 through pipe 15 and manifold 16 into inclined ducts 17 which extend laterally into the reaction chamber so as to direct the hot gases at an inclination or a tangential direction upon the acid pool. In the illustration given, four channels 17 open through the side walls of the chamber 11 just above the pool 13 so as to direct the gases upon the acid pool. As a result of such lateral impingement of gases, considerable turbulence results, and along with the evaporation of water vapor, droplets of acid 13a are directed upwardly through the dehydrator chamber 12. Further, the use of such jets permits reduction in the depth of the acid pool so as to reduce the average retention time of the liquid in the process to a brief period of a fraction of a minute.

An elevated withdrawal pipe 18 in the upper portion of the dehydration zone carries away the moisture-laden combustion gases which disengage from the acid in the space above the acid pool, and also some entrained acid droplets. Such droplets are separated in the separator (cyclone) 19, and recovered as liquid product through pipe outlet 20. The gases continue through pipe 21 to the floating bed scrubber 22 where condensable and water-soluble pollutants are removed.

The feed of acid to be dehydrated through pipe 10 may be maintained at a substantially constant value by a controlled circuit and may be set so as to automatically increase or decrease the amount of feed as required in order to maintain the acid in the pool at a predetermined temperature. Such control mechanism is shown in the copending patent application of William R. Mustian, Jr., Serial No. 354,669, filed March 25, 1964. If desired, liquid product may be drawn from the pool 13 and treated as described in said copending application. We prefer, however, to concentrate the heavy impurities in the pool 13 and then to withdraw such heavy residue through the line 23 by means of a sump pump or other means.

For the recovery of entrained droplets, we provide in the vapor space above the pool, an annular vessel 24 provided with a draw-off pipe 25.

The pool temperatures may vary from 350° to 750° F. or higher, if desired, and depending upon the final product to be prepared. For the fractionation of impurities and the concentration of the impurities in the heavy liquid residue at the bottom of the conical chamber 11, we prefer to employ high temperatures which will produce at least a fraction of metaphosphoric acid or other poly acids which combine with the metals and the impurities in the acids being treated so that the impurities may be separated from the relatively pure product. At the high temperatures, metaphosphoric acid groups and possibly other poly acid groups form polymers with the impurities, such as aluminum and iron, and these heavy polyphosphates find their way into the pool below, forming a heavy residue material therein. While the poly acids which effectively unite with the iron and aluminum, etc., are formed at high temperatures of about 650° to 1000° F. or higher, we have found that for most purposes the temperature range of 680° to 710° F. is very effective in producing the metal acid complexes described above.

In contrast with the heavy residue material in the pool carrying impurities, we find that the liquids collected in pipe 25 from vessel 24 and in pipe 20 from separator 19 are relatively pure products which are useful in the food, detergent, and other fields, while at the same time the heavy residue material withdrawn through pipe 23 has utility in the fertilizer field.

In the operation of the apparatus, as above described, we find that about 92 to 95 percent of the phosphoric acid can be recovered as liquid through the withdrawal pipes 20 and 25, while about 5 to 8 percent of the phosphoric acid is recovered with the impurities in the heavy residue fraction withdrawn through pipe 23.

By way of example, one can produce in the apparatus shown the wet process acid in excess of 80 percent $P_2O_5$ on a total analysis basis, with solids of about 0.1 percent, citrate insoluble of about 0.05 percent, $Fe_2O_3$ of about 0.3 percent, and $Al_2O_3$ of about 0.3 percent, this product being produced from a wet process feed of 54.7 percent $P_2O_5$ containing 1.9 percent $Al_2O_3$ and 1.23 percent of $Fe_2O_3$.

In the above operation, the efficiency of the separation of the impurities is enhanced by the discharge of the hot combustion gases from lateral points onto the acid pool so that the inclined jets create great turbulence and increase the lifting of droplets and the entrainment thereof upwardly through the chamber 12. We believe that the impurities in rising drops of acid tend to settle in the lower portion of the drops and that the drops tend to break into fragments, with the lighter fragments rising and the heavier fragments falling, thus bringing about an accumulation of the heavy impurity-bearing material in the pool 13, while the lighter droplets or fractions which rise into the vapor space above the pool and which are freed largely of their impurities are collected and recovered as a relatively pure product. Whatever be the explanation, we find that the acid material collected in the vapor space is relatively free of impurities, while a residue rich in impurities is formed in the bottom of the reaction vessel 11.

The separation operation above described is further facilitated by providing a dehydration zone above the pool which is open to permit free passage in volume of the entrained droplets into the vapor space. The only projection within the vapor space is the collector vessel 24 itself, and since this is annular there is provided a free open space through which the gases, vapors, and droplets may pass upwardly into the upper portion of the dehydration chamber. The space formerly occupied by a dip pipe, which in former installations projected downwardly through the dehydration chamber, is now free of such obstruction, and such space is utilized to receive the increased volume of entrained droplets produced by the lateral jets of gas through pipes 17. The jets may be one or more in number. We find, however, that where opposed jets are employed and the same are directed from the side of the vessel toward the pool, greater turbulence is brought about which lifts and entrains droplets of the acid.

The gaseous products of combustion from the furnace 14 may be discharged at widely-varying velocities depending upon the product being treated and the results desired. Usually gas velocities of about 1200 to 1500 feet per minute are satisfactory, but these may be reduced or increased where the proportions of the dehydrator are changed and the character of the product being treated is varied. The temperatures of the combustion gases may be varied also depending upon the product being treated and the results desired. Such temperatures are usually from 1500° to 1900° F., but higher or lower temperatures may be employed as desired. In order to reduce the temperature of the furnace gases, such gases may be diluted with outside air in the desired amount.

While in the foregoing specification we have set forth specific structure and process steps in considerable detail for the purpose of illustrating our invention, it will be understood that such detail or details may be varied widely by those skilled in the art without departing from the spirt of our invention.

We claim:

1. In a process for concentrating wet process phosphoric acid containing impurities, the steps of introducing said wet process phosphoric acid into a dehydration zone having a vapor outlet in the upper portion thereof and maintaining a pool thereof in the lower path of said zone, said zone providing an unobstructed path for vapor flow to said vapor outlet, directing upon the surface of said pool jets of hot combustion gases at an inclination to said pool for heating said acid to vaporize water and at a velocity to entrain acid droplets, withdrawing gas and vapors from the upper portion of said zone, collecting entrained acid droplets in said vapor space above said pool and withdrawing the same, and withdrawing acid from said pool.

2. In apparatus for the concentration of phosphoric acids, a casing providing a dehydration chamber adapted to retain a pool of said acids in the lower portion thereof, an annular vessel supported within said casing and above said pool of acids for collecting entrained droplets, means for introducing acids into said pool, means for directing an inclined jet of combustion gases upon said pool to entrain droplets of acid into the upper portion of said chamber and to heat said acids to dehydrating temperature, means for withdrawing gases, vapor and acid droplets from the vapor space above said pool, and means for withdrawing acids from said pool.

3. In apparatus for the concentration of phosphoric acids, a casing providing a dehydration chamber having its walls near the bottom tapering downwardly and inwardly to form a frusto-conical vessel for retaining a pool of said acids having its widest portion at the top thereof and providing an unobstructed path for vapor flow in the upper portion of said chamber, means for introducing said acids into said pool, means for directing a plurality of jets of combustion gases upon the surface of said pool to entrain droplets of acid into the upper portion of said chamber and to heat said acids to dehydrating temperature, means for withdrawing gases, vapors and acid from said vapor space above said pool, and means for withdrawing liquid from said pool.

4. In apparatus for the concentration of phosphoric acids, a casing providing a dehydration chamber having its walls near the bottom tapering downwardly and inwardly to form a vessel for retaining a pool of said acids having its widest portion at the top thereof, means for introducing said acids into said pool, means for directing a jet of combustion gases upon the surface of said pool in a direction toward an upwardly-inclined wall of said acid-containing vessel to entrain droplets of acid and to heat the said acids to dehydrating temperatures, means for withdrawing gases, vapors and entrained acid droplets from the vapor space above said pool, means for separately recovering said entrained acid droplets, and means for withdrawing liquid from said pool.

References Cited by the Examiner

UNITED STATES PATENTS

| | | | |
|---|---|---|---|
| 1,264,182 | 4/1918 | Hackenbleikner | 23—275 |
| 1,264,509 | 4/1918 | Hackenbleikner | 23—275 |
| 1,314,485 | 8/1919 | Davis | 23—307 |
| 1,924,919 | 8/1933 | Flowers. | |

NORMAN YUDKOFF, *Primary Examiner.*

J. SOFER, *Assistant Examiner.*